United States Patent
Kwon et al.

(10) Patent No.: US 11,632,814 B2
(45) Date of Patent: Apr. 18, 2023

(54) METHOD FOR PROVIDING ACCESSIBILITY FEATURE AND ELECTRONIC DEVICE FOR PERFORMING SAME

(71) Applicant: SAMSUNG ELECTRONICS CO., LTD., Suwon-si (KR)

(72) Inventors: Sunghyuk Kwon, Suwon-si (KR); Myungkwan Choi, Suwon-si (KR); Myungsun Kim, Suwon-si (KR); Seokhyun Kim, Suwon-si (KR); Seunghwan Lee, Suwon-si (KR); Bonghyun Cho, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 247 days.

(21) Appl. No.: 16/959,304

(22) PCT Filed: Jan. 3, 2019

(86) PCT No.: PCT/KR2019/000090
§ 371 (c)(1),
(2) Date: Jun. 30, 2020

(87) PCT Pub. No.: WO2019/135616
PCT Pub. Date: Jul. 11, 2019

(65) Prior Publication Data
US 2021/0058991 A1 Feb. 25, 2021

(30) Foreign Application Priority Data
Jan. 8, 2018 (KR) .................. 10-2018-0002502

(51) Int. Cl.
*H04W 4/60* (2018.01)
*H04W 76/14* (2018.01)
(Continued)

(52) U.S. Cl.
CPC ............ *H04W 76/14* (2018.02); *H04W 4/50* (2018.02); *H04W 4/60* (2018.02); *H04W 4/80* (2018.02)

(58) Field of Classification Search
CPC ............ H04L 12/50; H04W 4/50; H04W 4/60
(Continued)

(56) References Cited

U.S. PATENT DOCUMENTS 9,619,113 B2  4/2017  Mark
9,712,657 B2  7/2017  De Filippis et al.
(Continued)

FOREIGN PATENT DOCUMENTS

KR  10-2013-0030691   3/2013
KR  10-2014-0124407   10/2014
(Continued)

OTHER PUBLICATIONS

KR2013-0030691 A ( LG Electronics Inc.) Mar. 27, 2013, 17 pages.*
(Continued)

*Primary Examiner* — Dang T Ton
(74) *Attorney, Agent, or Firm* — Nixon & Vanderhye, P.C.

(57) ABSTRACT

According to various embodiments of the disclosure, an electronic device includes a wireless communication circuit that communicates with an external electronic device, and a processor, wherein the processor may pair the electronic device with the external electronic device by using the wireless communication circuit, obtain accessibility setting information of the external electronic device from the external electronic device, and set an accessibility feature of the electronic device based on at least a piece of the obtained
(Continued)

accessibility setting information. In addition, it is possible to implement various embodiment understood through the disclosure.

15 Claims, 7 Drawing Sheets

(51) Int. Cl.
    *H04W 4/50*     (2018.01)
    *H04W 4/80*     (2018.01)

(58) Field of Classification Search
    USPC .......................................................... 370/329
    See application file for complete search history.

(56) References Cited

U.S. PATENT DOCUMENTS

| | | | |
|---|---|---|---|
| 2012/0154128 A1 | 6/2012 | Cho et al. | |
| 2017/0132379 A1 | 5/2017 | Gotcher et al. | |
| 2017/0186079 A1 | 6/2017 | Kim et al. | |
| 2017/0220227 A1 | 8/2017 | Mark | |
| 2017/0235924 A1 | 8/2017 | Kuehler et al. | |
| 2020/0319621 A1* | 10/2020 | Roy | ........................ G01K 3/005 |

FOREIGN PATENT DOCUMENTS

| | | |
|---|---|---|
| KR | 10-2016-0016440 | 2/2016 |
| KR | 10-2016-0055627 | 5/2016 |
| KR | 10-2016-0076347 | 6/2016 |
| KR | 10-2017-0076992 | 7/2017 |
| WO | 2016/126324 | 8/2016 |

OTHER PUBLICATIONS

International Search Report for PCT/KR2019/000090 dated Apr. 30, 2019, 5 pages.
Written Opinion of the ISA for PCT/KR2019/000090 dated Apr. 30, 2019, 4 pages.

* cited by examiner

METHOD FOR PROVIDING ACCESSIBILITY FEATURE AND ELECTRONIC DEVICE FOR PERFORMING SAME

This application is the U.S. national phase of International Application No. PCT/KR2019/000090 filed Jan. 3, 2019 which designated the U.S. and claims priority to KR Patent Application No. 10-2018-0002502 filed Jan. 8, 2018, the entire contents of each of which are hereby incorporated by reference.

FIELD

The disclosure relates to a method of providing an accessibility feature and an electronic device performing the same.

DESCRIPTION OF RELATED ART

As information technology (IT) has been developed, smart functions have been incorporated into various electronic devices such as mobile phones, TVs, refrigerators, washing machines, or the like. For example, a TV on which a smart function is grafted may not only provide an output of video content, but also be combined with a network such as the Internet to communicate with a smart phone, a tablet PC, or other smart home appliances. In addition, the TV onto which the smart function is grafted may provide various functions to the user, such as web surfing, e-commerce, or the like, by using the Internet.

Meanwhile, as described above, the electronic devices onto which the smart functions are grafted may provide an accessibility feature. The accessibility feature may mean a feature provided to allow anyone to use an environment such as an electronic device, a service, an information communication network, or the like without inconvenience. For example, the accessibility feature may be understood as various features such that a disabled person or an elderly person with an uncomfortable body part is not restricted from using the electronic device due to the physical discomfort. For example, the electronic device may provide a voice assistant feature as an accessibility feature for blind people.

Recently, an electronic device has provided a user with more various accessibility features. In addition, the electronic device provides a more effective accessibility feature to the user by allowing a more detailed setting of the accessibility feature.

SUMMARY

A user may set the accessibility feature of an electronic device. For example, a user may set whether to activate, for example, a voice guidance feature among the accessibility features. As another example, a user may set the speed or voice type of the voice guidance provided by the voice guidance feature.

However, as the types of accessibility features are more diversified and detailed setting items are more increased, a user may spend more time to set the accessibility features.

In addition, as the number of electronic devices that provide the accessibility feature increases due to recent advances in technology, a user may spend a lot of time setting the accessibility feature every time a electronic device is used. Particularly, when the accessibility feature is differently set for each electronic device, the user may feel a sense of heterogeneity or discomfort in use due to different usage environments.

According to an embodiment disclosed in the disclosure, an electronic device may include a wireless communication circuit that communicates with an external electronic device, and a processor, wherein the processor may pair the electronic device with the external electronic device by using the wireless communication circuit, obtain accessibility setting information of the external electronic device from the external electronic device, and set an accessibility feature of the electronic device based on at least a piece of the obtained accessibility setting information.

In addition, according to an embodiment disclosed in the disclosure, a method may include pairing with an external electronic device, obtaining accessibility setting information of the external electronic device from the external electronic device, and setting an accessibility feature of the electronic device based on at least a piece of the obtained accessibility selling information.

According to the embodiments disclosed in the disclosure, it is possible to reduce the time taken for a user to set the accessibility feature of an electronic device. In addition, the user may set the accessibility feature of a new electronic device in the same manner as in the electronic device used in the past. Thus, the user may minimize heterogeneity in using a new electronic device and increase convenience of use.

In addition, various effects that are directly or indirectly understood through the disclosure may be provided.

BRIEF DESCRIPTION OF THE DRAWINGS

The same or similar reference numerals may be used for the same or similar components in connection with the description of the drawings.

DETAILED DESCRIPTION

Figure 1:
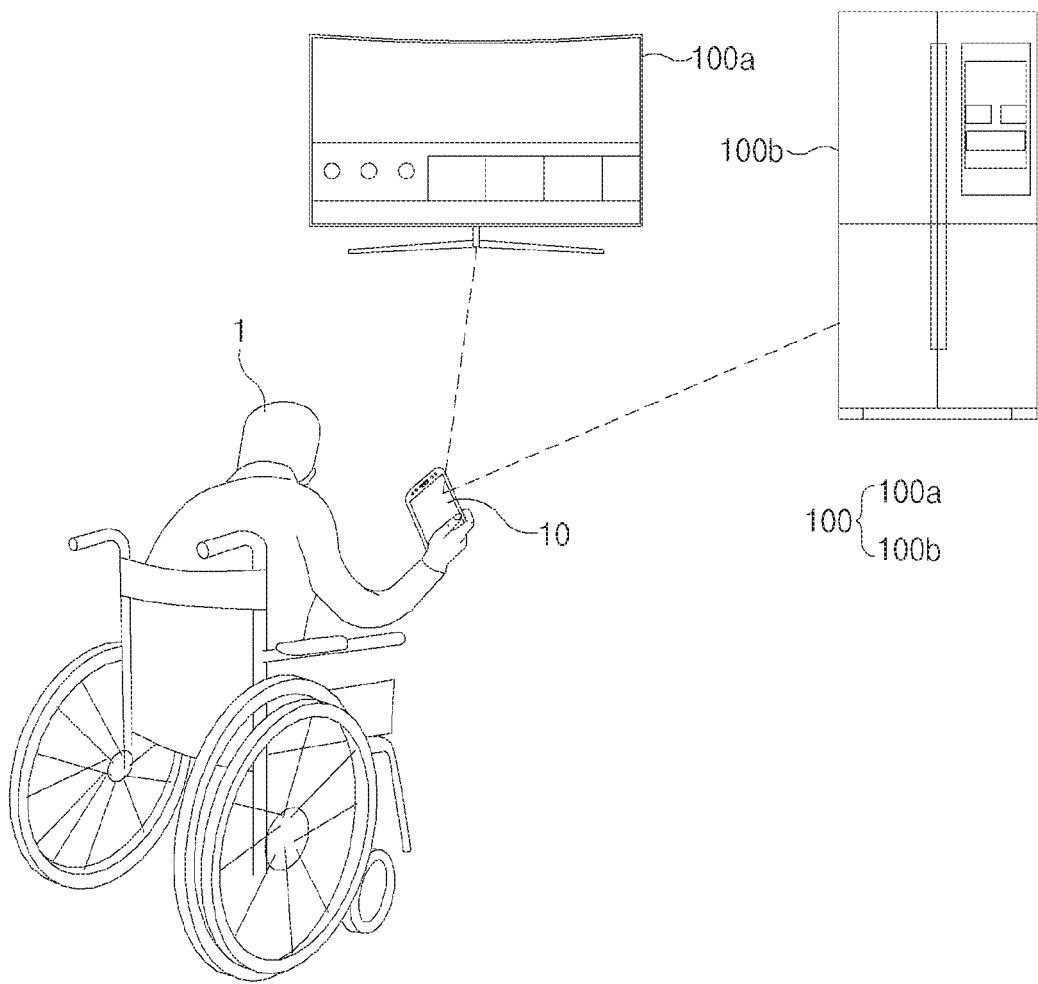
FIG. 1 is a view illustrating a state in which a user sets an accessibility feature of an electronic device through an eternal electronic device according to an embodiment.

Various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the present invention, With regard to description of drawings, similar elements may be marked by similar reference numerals.

FIG. 1 is a view illustrating a state in which a user sets an accessibility feature of an electronic device through an external electronic device according to an embodiment.

Referring to FIG. 1, a user 1 may set an accessibility feature of an electronic device 100 such as a TV 100a or a refrigerator 100b by using an external electronic device 10. According to various embodiments, the electronic device 100 is not limited to that illustrated in FIG. 1. For example, the electronic device 100 may include a computer, a laptop computer, a tablet PC, a smart phone, and the like in addition to the TV 100a and the refrigerator 100b illustrated in FIG. 1.

The accessibility feature means features of preventing the use of the electronic device 100 or the external electronic device 10 from being restricted due to physical or mental discomfort of the user 1 and improving the convenience of the user 1.

According to an embodiment, the electronic device 100 or the external electronic device 10 may provide an accessibility feature such as a voice assistant feature, a screen magnifier feature, a high contrast feature, a color adjustment feature, or the like to the user 1 having reduced visual ability.

For example, the voice assistant feature may be a feature of providing the voice guidance for an operation corresponding to a touch when the user 1 touches a specified area of a display. As another example, the screen magnifier feature may be a feature that enlarges a screen displayed on the specified area and provides the enlarged screen to the user 1 when the user 1 is touching a specified area of a display.

According to another embodiment, the electronic device 100 or the external electronic device 10 may provide a light notification feature or a subtitle feature to the user 1 having reduced hearing ability.

For example, the light notification feature may be a feature of providing a notification to the user 1 with a camera light or a display screen light instead of sound or vibration when the notification such as message reception occurs.

According to an embodiment, the external electronic device 10 may be a device in which an accessibility feature has already been set by the user 1. For example, the external electronic device 10 may be a mobile device previously used by the user 1, such as a smart phone, a tablet PC, or the like. Among the accessibility features of the external electronic device 10, a feature required by the user 1 may be in an active state, and unnecessary features may be in an inactive state. For example, in the external electronic device 10, the voice assistant feature may be active and the subtitle function may be inactive. In addition, in the external electronic device 10, detailed item information of the voice assistant feature, for example, the speed of the voice may be already set to the speed optimized for the user 1.

According to an embodiment, the accessibility feature may not be set into the electronic device 100 such as the TV 100a and the refrigerator 100b shown in FIG. 1, or may be set differently from the accessibility feature of the external electronic device 10. For example, the TV 100a may be newly purchased and may be in a state where the accessibility feature is not set at all. As another example, an accessibility feature may be set to the refrigerator 100b by another user, but may be set differently from the accessibility feature of the external electronic device 10 set by the user 1.

Hereinafter, in the disclosure, a method of easily setting an accessibility feature of the electronic device 100 by the user 1 by using the external electronic device 10 will be described. In the disclosure, the contents described in FIG. 1 may be equally applied to the components having the same reference numerals as the electronic device 100 or the external electronic device 10 shown in FIG. 1.

Figure 2:
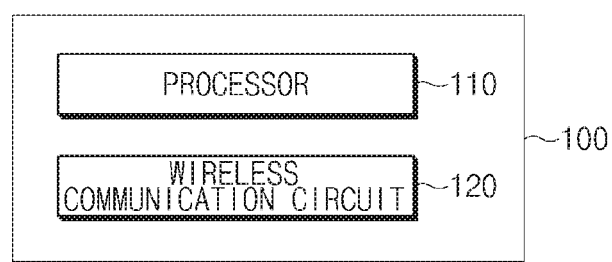
FIG. 2 is a block diagram of an electronic device according to an embodiment.

FIG. 2 is a block diagram of an electronic device according to an embodiment.

Referring to FIG. 2, the electronic device 100 may include a processor 110 and a wireless communication circuit 120. According to various embodiments, the electronic device 100 may further include a configuration not shown in FIG. 2. For example, the electronic device 100 may further include a display, a memory, a touch sensor, and the like.

The processor 110 may perform necessary operations or data processing related to control or communication for other components of the electronic device 100. For example, the processor 110 may control the wireless communication circuit 120 to transmit or receive specified data through communicating with the external electronic device 10. As another example, the processor 110 may store data received from the external electronic device 10 in a memory or perform a specified operation based on the received data.

In various embodiments, the processor 110 may be a central processing unit (CPU), a communication processor (CP), a sensor hub, or an application processor (AP).

The wireless communication circuit 120 may support data transmission between the electronic device 100 and the external electronic device 10 based on a specified wireless communication protocol. For example, the wireless communication circuit 120 may receive accessibility setting information of the external electronic device 10 from the external electronic device 10. The accessibility setting information may include, for example, whether the accessibility feature is activated or detailed item information of the activated accessibility feature.

According to an embodiment, the wireless communication circuit 120 may support at least one wireless communication protocol. For example, the wireless communication circuit 120 may support at least one wireless communication protocol among Bluetooth, Zigbee, a wireless highway addressable remote transducer (HART) scheme, near field communication (NFC), Wi-Fi, Wi-Fi Direct, a GSM/3GPP series communication scheme (e.g., GSM, HSDPA, LTE-A), a 3GPP2 series communication scheme (e.g. CDMA, or CDMA2000), or a WiMax series communication scheme (e.g., Wibro).

In the disclosure, the contents described in FIG. 2 may be applied to the components having the same reference numerals as the electronic device 100 illustrated in FIG. 2.

Figure 3:
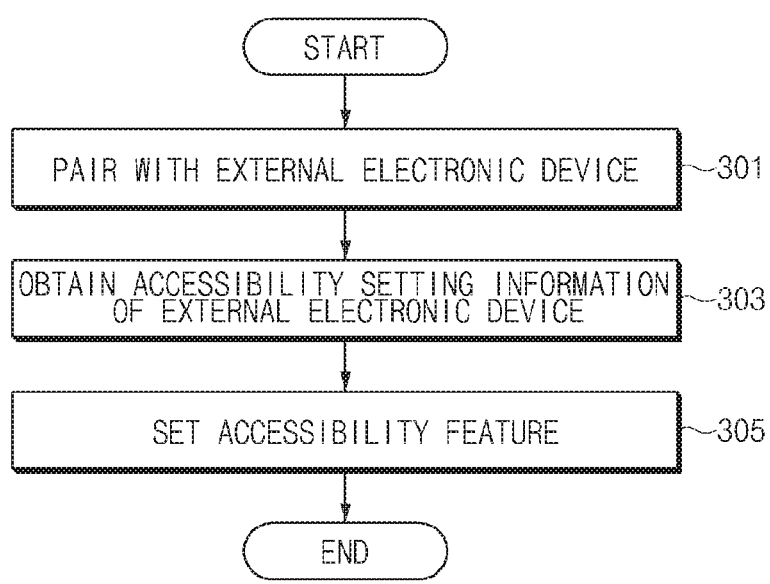
FIG. 3 is a flowchart illustrating a method of setting an accessibility feature of an electronic device according to an embodiment.

FIG. 3 is a flowchart illustrating a method of setting an accessibility feature of an electronic device according to an embodiment.

Referring to FIG. 3, a method of setting an accessibility feature of the electronic device 100 may include operations 301 to 305. According to an embodiment, it may be understood that operations 301 to 305 are performed by the electronic device 100 or the processor 110 included in the electronic device 100.

In operation 301, the electronic device 100 may be paired with the external electronic device 10. For example, the processor 110 may use the wireless communication circuit 120 to exchange identification information (e.g., a device ID or PIN number) between the electronic device 100 and the external electronic device 10, thereby pairing the electronic device 100 with the external electronic device 10. As another example, the processor 110 may pair the electronic device 100 with the external electronic device 10 through a server by using the wireless communication circuit 120.

In operation 303, the electronic device 100 may obtain the accessibility setting information of the external electronic device 10 from the external electronic device 10. Because the electronic device 100 and the external electronic device 10 are paired with each other in operation 301, the data transmission between each other, for example transmission of accessibility setting information, may be possible.

According to an embodiment, the accessibility setting information includes an accessibility feature activated in the external electronic device 10, an accessibility feature deactivated in the external electronic device 10, or detailed item information about the activated accessibility feature. For example, the accessibility setting information may include the fact that the voice assistant feature activated in the external electronic device 10 is the activated accessibility feature, and may include the fact that the speed of voice is set to be slowest as the detailed item information of the voice assistant feature. As another example, the accessibility setting information may include the fact that the high contrast feature is deactivated in the external electronic device 10.

In operation 305, the electronic device 100 may set the accessibility feature of the electronic device 100 based on at least a piece of the accessibility setting information of the external electronic device 10 obtained in operation 303.

According to an embodiment, the electronic device 100 may activate some of the accessibility features of the electronic device 100 based on the information about the accessibility features activated in the external electronic device 10 among the accessibility setting information. For example, when the voice assistant feature is activated in the external electronic device 10, the electronic device 100 may activate the voice assistant feature among the accessibility features of the electronic device 100 based on the accessibility setting information.

According to an embodiment, the electronic device 100 may deactivate some of the accessibility features of the electronic device 100 based on the information about the accessibility features deactivated in the external electronic device 10 among the accessibility setting information. For example, when the high contrast feature is deactivated in the external electronic device 10, the electronic device 100 may deactivate the high contrast feature among the accessibility features of the electronic device 100 based on the accessibility setting information.

According to an embodiment, the electronic device 100 may set detailed items of an activated accessibility feature of the electronic device 100 based on detailed item information of the accessibility feature activated in the external electronic device 10 among the accessibility setting information. For example, when the voice assistant feature is activated in the external electronic device 10 and the speed of voice is set the slowest as a detailed item, the electronic device 100 may set the voice speed of the voice assistant feature of the electronic device 100 to the slowest, based on the accessibility setting information.

As described above, through operations 301 to 305, the user 1 may quickly and efficiently set the accessibility feature of the electronic device 100.

Figure 4:
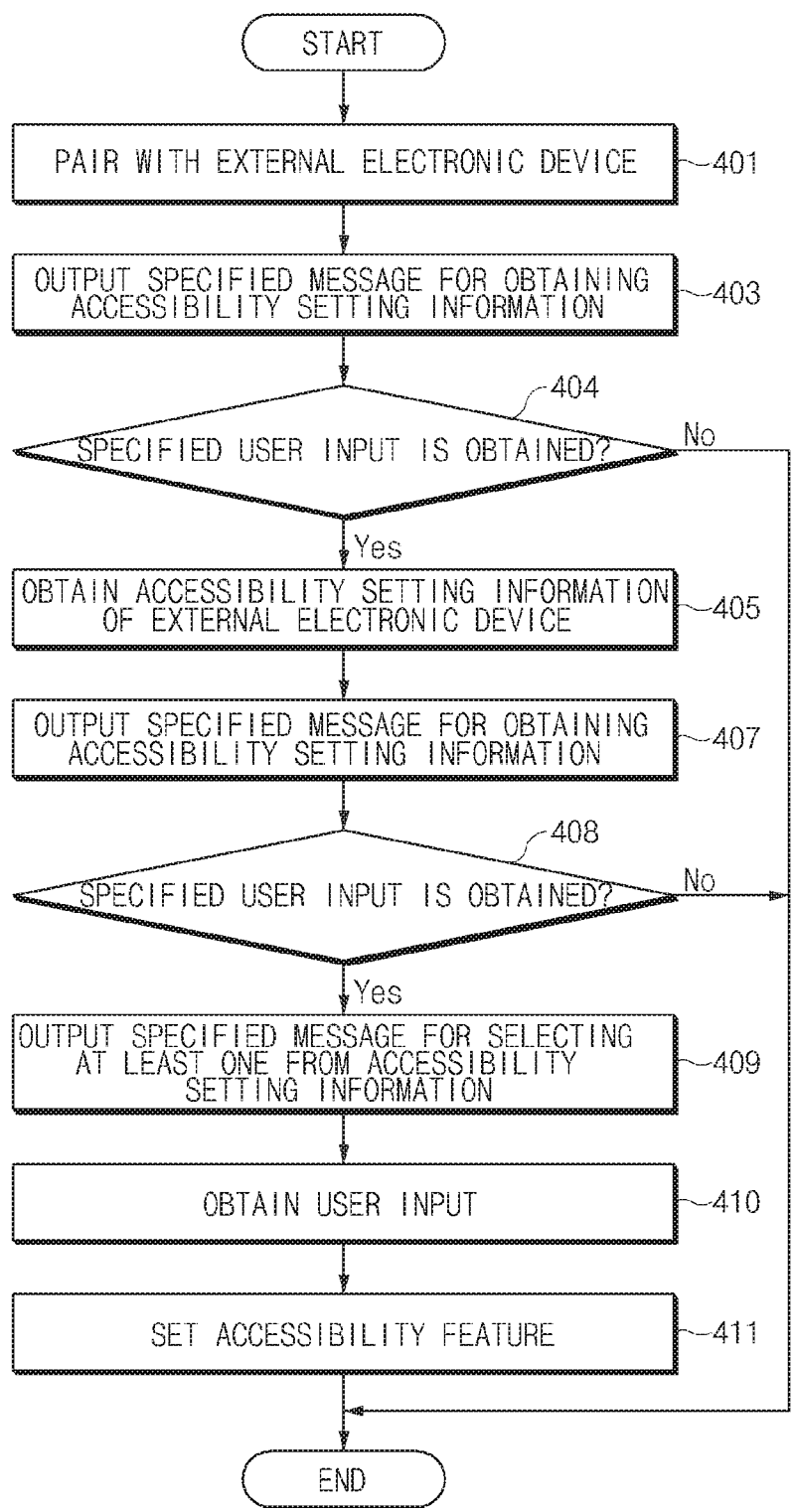
FIG. 4 is a flowchart illustrating a method of setting an accessibility feature of an electronic device according to another embodiment.

FIG. 4 is a flowchart illustrating a method of setting an accessibility feature of the electronic device 100 according to another embodiment.

Referring to FIG. 4, a method of setting an accessibility feature of the electronic device 100 may include operations 401 to 411. According to an embodiment, it may be understood that operations 401 to 411 are performed by the electronic device 100 or the processor 110 included in the electronic device 100.

In operation 401, the electronic device 100 may be paired with the external electronic device 10. According to an embodiment, operation 401 may be the same as or similar to operation 301 of FIG. 3.

In operation 403, the electronic device 100 may output a specified message for obtaining accessibility setting information to a display. For example, the electronic device 100 may request a user input on whether to obtain the accessibility setting information of the external electronic device 10 after being paired with the external electronic device 10 in operation 401. For example, the electronic device 100 may output a specified message of requesting the user input to the display.

In operation 404, the electronic device 100 may determine whether the specified user input is obtained. According to an embodiment, when a user input for obtaining the accessibility setting information of the external electronic device 10 is received, the electronic device 100 may perform operation 405. According to another embodiment, when a user input is not received or a user input that does not acquire accessibility setting information of the external electronic device 10 is received, the electronic device 100 may terminate the operation without performing operation 405.

In operation 405, the electronic device 100 may obtain the accessibility setting information in response to receiving the user input regarding obtaining the operation accessibility setting information. According to an embodiment, operation 405 may be the same as or similar to operation 303 of FIG. 3.

In operation 407, the electronic device 100 may output a specified message on whether to set the accessibility feature to the display. For example, the electronic device 100 may request a user input on whether to set the accessibility feature based on the accessibility setting information of the external electronic device 10 obtained in operation 405. For example, the electronic device 100 may output the specified message of requesting the user input to the display.

In operation 408, the electronic device 100 may determine whether a specified user input is obtained. According to an embodiment, when a user input for setting the accessibility feature based on the accessibility setting information of the external electronic device 10 is received, the electronic device 100 may perform operation 409. According to another embodiment, when a user input is not received or a user input that does not perform the setting of the accessibility feature is received, the electronic device 100 may terminate the operation without performing operation 409.

In operation 409, the electronic device 100 may output a specified message for selecting at least one from accessibility setting information to a display. For example, the electronic device 100 may output whether to activate each feature of the accessibility feature of the external electronic device 10 to the display. The electronic device 100 may output, to the display, a specified message of requesting a user input for selecting at least one of the accessibility features.

In operation 410, the electronic device 100 may obtain a user input corresponding to operation 409. For example, the electronic device 100 may obtain a user input for selecting all or some of the accessibility features of the external electronic device 10 output in operation 409. For example, among the accessibility features of the external electronic device 10, the voice assistant feature and the magnifier feature may be activated, and the high contrast feature may be deactivated. In this case, the electronic device 100 may obtain a user input of selecting only the voice assistant feature, or may obtain a user input of selecting all of the voice assistant feature, the magnifier feature, and the high contrast feature.

In operation 411, the electronic device 100 may set the accessibility feature of the electronic device 100 based on at least one selected from the accessibility setting information in response to the reception of the user input performed in operation 410. For example, in operation 410, a user input for selecting only a voice assistant feature among a plurality of accessibility features may be obtained. In this case, the electronic device 100 may perform only setting of the voice assistant feature among the accessibility features based on whether the external electronic device 10 activates the voice assistant feature and detailed item information.

According to an embodiment, the operations 409 to 410 may be omitted. For example, when a user input for setting the accessibility feature based on the accessibility setting information is received in operation 408, the electronic device 100 may set the accessibility feature of the electronic device 100 in response to receiving the user input.

In various embodiments, the operation 411 in which the electronic device 100 sets an accessibility feature may include an operation which is the same as or similar to operation 303 illustrated in FIG. 3. For example, the electronic device 100 may set activation or deactivation of the accessibility feature based on at least a piece of the obtained accessibility setting information, and may set detailed items of the activated accessibility feature.

As described above, through operations 401 to 411, the user 1 may quickly and efficiently set the accessibility feature of the electronic device 100.

Figure 5:
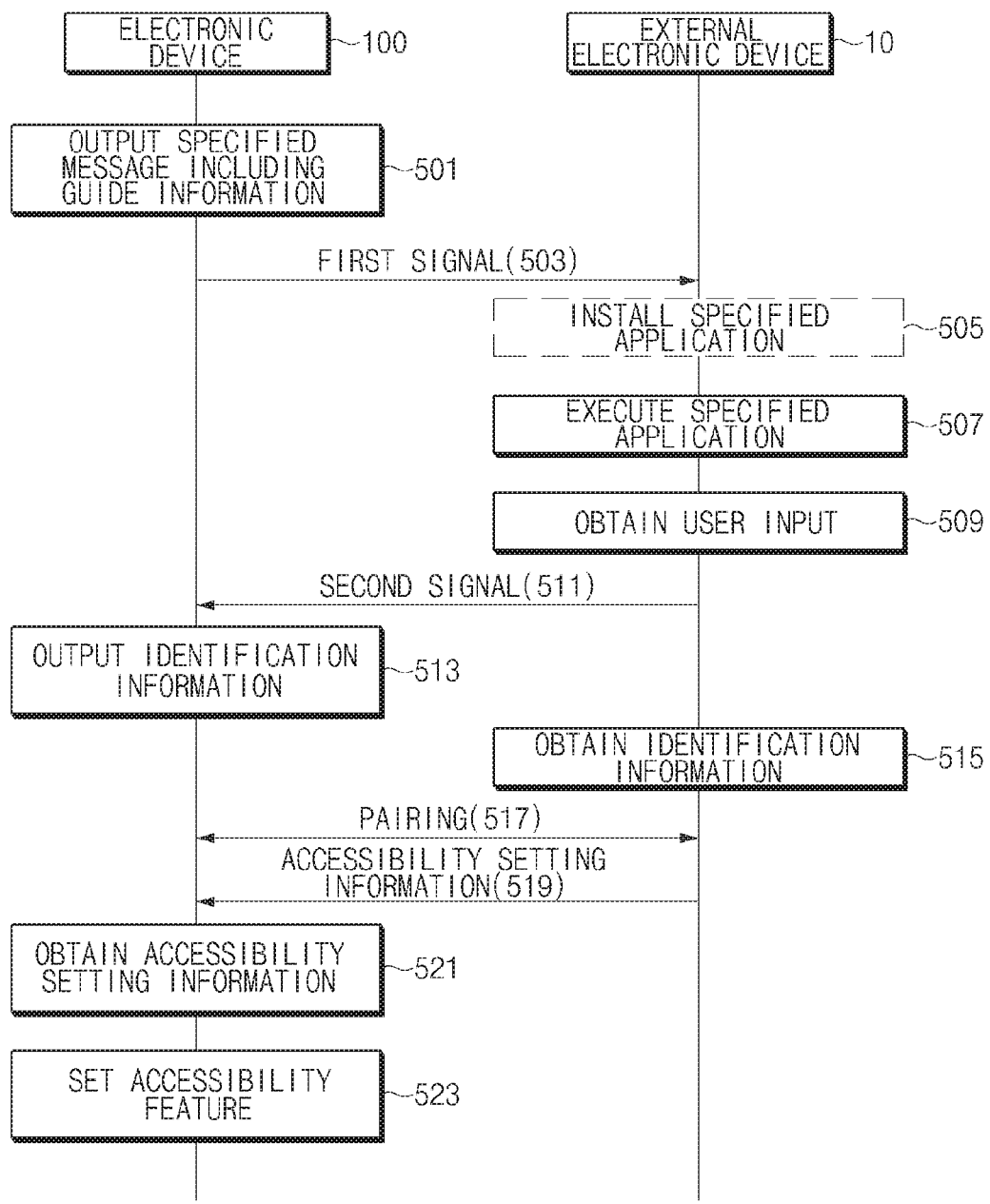
FIG. 5 is a flowchart illustrating a method of setting an accessibility feature by an electronic device connected to an external electronic device according to an embodiment.

FIG. 5 is a flowchart illustrating a method of setting an accessibility feature by an electronic device connected to an external electronic device according to an embodiment.

Referring to FIG. 5, a method of setting an accessibility feature by the electronic device 100 connected to the external electronic device 10 may include operations 501 to 523.

In operation 501, the electronic device 100 may output a specified message including guide information for pairing to a display. For example, the guide information may include content that guides the user 1 to install and execute a specified application on the external electronic device 10.

According to an embodiment, the electronic device 100 outputting the specified message may be in a state in which any feature including an accessibility feature is not set. For example, the electronic device 100, which is newly purchased by the user 1, may be in a state in which initial setting is required. In this case, the electronic device 100 may perform initial setting including the setting of the accessibility feature through operation 501.

In operation 503, the electronic device 100 may transmit a first signal including request information for pairing to the external electronic device 10 by using a wireless communication circuit. The request information for pairing may be understood as, for example, information requesting an attempt to pair with the master of the Bluetooth connection.

In an embodiment, the first signal may be a signal emitted without directivity for pairing with another electronic device 100. For example, the first signal may be a Bluetooth low energy (BLE) signal.

In operation 505, the application specified by the user 1 may be installed into the external electronic device 10. The specified application may include an application for pairing with the electronic device 100 or an application for data transmission with the electronic device 100.

According to an embodiment, in operation 501, the user 1 may recognize the specified message output from the electronic device 100 and install the specified application to the external electronic device 10. According to another embodiment, the external electronic device 10 may output a specified message for installing a specified application to a display in response to the first signal received in operation 503. In this case, the external electronic device 10 may obtain the input of the user 1 corresponding to the specified message and install the specified application.

According to an embodiment, operation 505 may be omitted when the specified application is already installed in the external electronic device 10.

In operation 507, the specified application installed in operation 505 may be executed in the external electronic device 10. In an embodiment, when the specified application is executed, the external electronic device 10 may output a specified message for pairing with the electronic device 100. For example, the specified message may be a message requesting an input of the user 1 for pairing with the electronic device 100.

In operation 509, the external electronic device 10 may obtain the input of the user 1 corresponding to the specified message output in operation 507. For example, the external electronic device 10 may obtain the input of the user 1 that attempts to pair with the electronic device 100.

In operation 511, the external electronic device 10 may transmit a second signal including connection information for pairing to the electronic device 100. The connection information for the pairing may be understood as, for example, network information of the external electronic device 10.

In operation 513, the electronic device 100 may output identification information for pairing to the display in response to the reception of the second signal. The identification information may be understood as, for example, a PIN code for a Bluetooth connection.

In operation 515, the external electronic device 10 may obtain identification information of the electronic device 100 by the user 1. For example, the external electronic device 10 may obtain identification information of the electronic device 100 through the input of the user 1. For example, the user 1 may input the identification information output to the display of the electronic device 100 to the external electronic device 10. The external electronic device 10 may obtain the identification information input from the user 11.

In operation 517, the electronic device 100 may be paired with the external electronic device 10. The external electronic device 10 may use the identification information of the electronic device 100 obtained in operation 515 to recognize the electronic device 100 as a pairing permitted object, and may pair with the electronic device 100 in response to the obtaining of the identification information. Because the electronic device 100 is paired with the external electronic device 10, the electronic device 100 and the external electronic device 10 may transmit information or data to the counter party.

In operation 519, the external electronic device 10 may transmit accessibility setting information to the electronic device 100. The accessibility setting information may be information about an accessibility feature set in the external electronic device 10. For example, the accessibility setting information may include information about an activated accessibility feature, an deactivated accessibility feature, or detailed items on the activated accessibility feature among the plurality of accessibility features.

In operation 521, the electronic device 100 may obtain the accessibility setting information of the external electronic device 10. According to various embodiments, operation

521 may be the same as or similar to the operation 303 illustrated in FIG. 3, and may include operations 403 to 410 illustrated in FIG. 4.

In operation 523, the electronic device 100 may set the accessibility feature based on at least a piece of the accessibility setting information obtained in operation 521. According to various embodiments, operation 523 may be the same as or similar to operation 305 illustrated in FIG. 3 or operation 411 illustrated in FIG. 4.

The electronic device 100 is connected to the external electronic device 10 through the operations 501 to 523 to quickly and efficiently set an accessibility feature.

Figure 6:
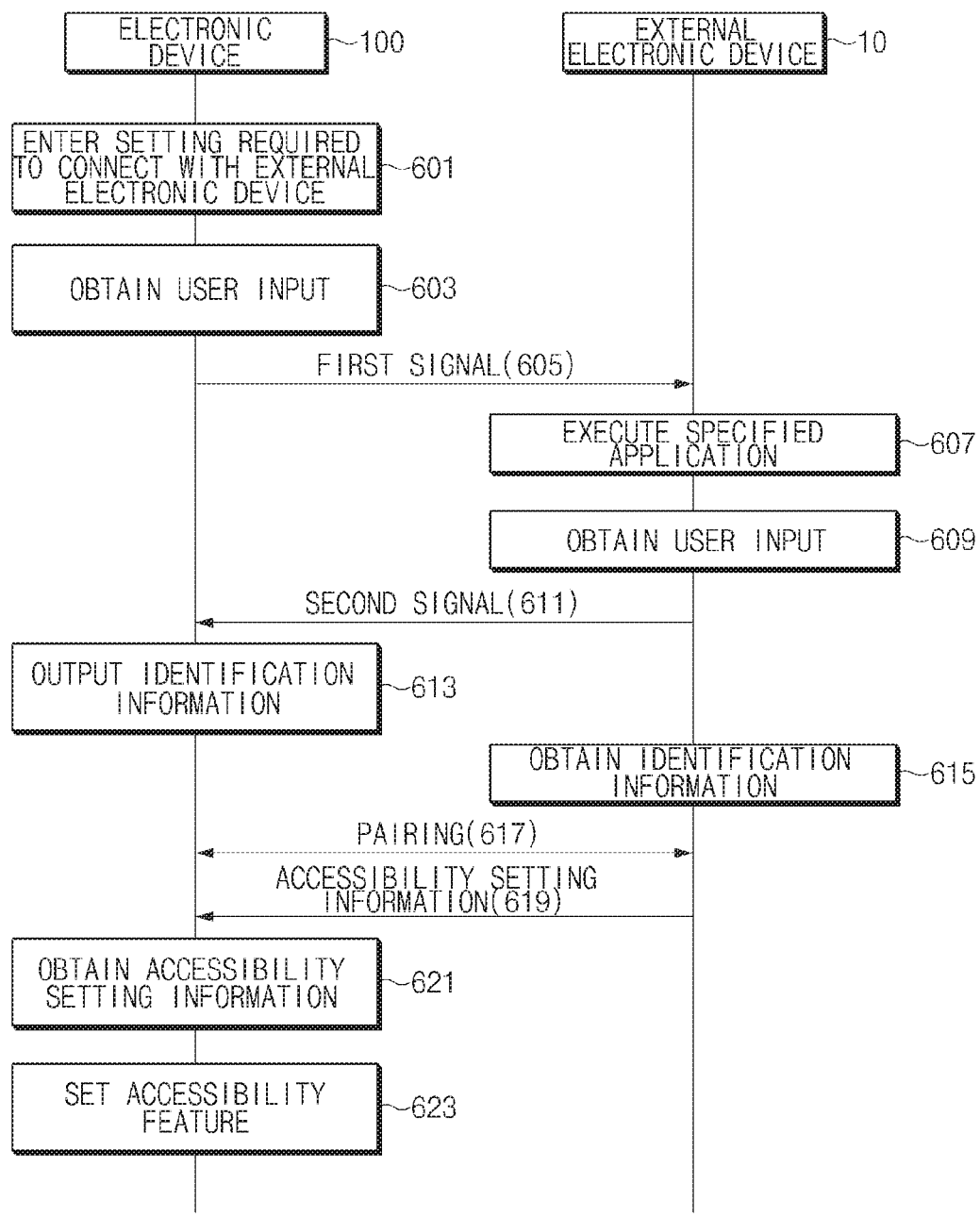
FIG. 6 is a flowchart illustrating a method of setting an accessibility feature by an electronic device connected to an external electronic device according to another embodiment.

FIG. 6 is a flowchart illustrating a method of setting an accessibility feature by an electronic device connected to an external electronic device according to another embodiment.

Referring to FIG. 6, a method of setting an accessibility feature by the electronic device 100 connected to the external electronic device 10 may include operations 601 to 623.

In operation 601, the electronic device 100 may enter a setting that requires connection with the external electronic device 10. For example, when the user 1 is to set the accessibility feature of the electronic device 100 such as a TV, it may more useful or convenient to control the electronic device 100 by using an input device (e.g., a remote controller) of the TV rather than the external electronic device, for example, an input device (e.g., a touch pad) of a smart phone. In this case, the TV may be required to be connected to a smart phone that is the external electronic device 10 in order to set the accessibility feature.

In operation 603, the electronic device 100 may obtain an input of the user 1 for pairing with the external electronic device 10. For example, the electronic device 100 may output a specified message for requesting the input of the user 1 to the display. For example, the specified message may be a message of requesting the input of the user 1 to allow the smart phone that is the external electronic device 10 to control the electronic device 100. The electronic device 100 may obtain the input of the user 1 to pair with the external electronic device 10 in response to the specified message.

In operation 605, the electronic device 100 may transmit the first signal including request information for pairing to the external electronic device 10 in response to the input of the user 1 obtained in operation 603. According to an embodiment, the first signal may be the same as or similar to the first signal transmitted from the electronic device 100 to the external electronic device 10 in the operation 503 of FIG. 5.

In operations 607 to 623, the electronic device 100 and the external electronic device 10 may perform operations that are the same to or similar to the operations 507 to 523 illustrated in FIG. 5.

Through operations 601 to 623, the electronic device 100 may be connected to the external electronic device 10 to quickly and efficiently set the accessibility feature of the electronic device 100.

Figure 7:
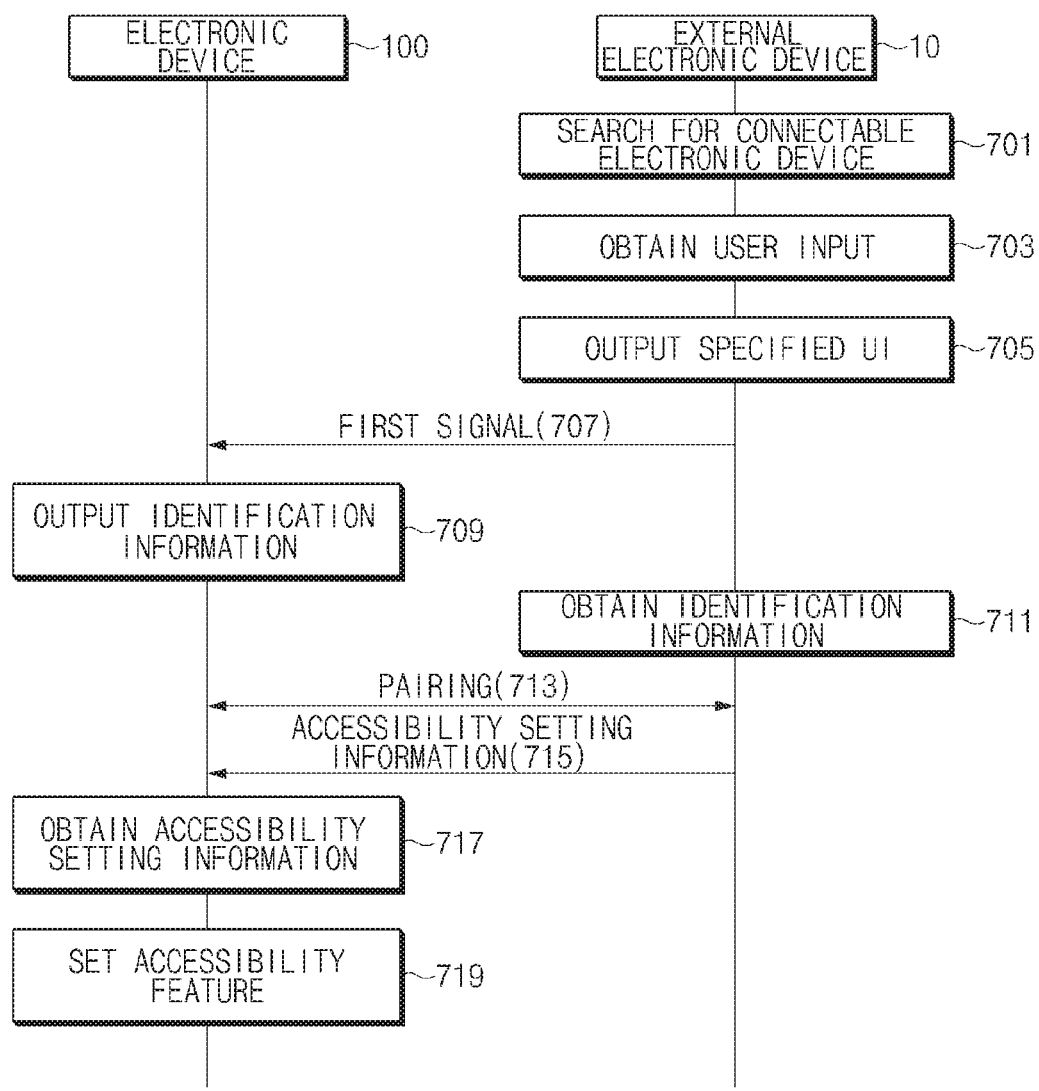
FIG. 7 is a flowchart illustrating a method of setting an accessibility feature by an electronic device connected to an external electronic device according to another embodiment.

FIG. 7 is a flowchart illustrating a method of setting an accessibility feature by an electronic device connected to an external electronic device according to er embodiment.

Referring to FIG. 7, a method of setting an access nil feature by the electronic device 100 connected to the external electronic device 10 may include operations 701 to 719.

In operation 701, the external electronic device 10 may search for the connectable electronic device 100. For example, the external electronic device 10 may execute a specified application and search for the connectable electronic device 100 within a specified distance from the external electronic device 10 in response to a specified input of the user 1.

According to an embodiment, the external electronic device 10 may output the search result to a display. For example, the external electronic device 10 may output a list of connectable electronic devices existing within a specified distance to the display.

In operation 703, the external electronic device 10 may obtain an input of the user 1 for selecting one from the connectable electronic devices. The external electronic device 10 may attempt to pair with the selected one electronic device in response to the input of the user 1. In one embodiment, the selected one electronic device may be the electronic device 100.

In operation 705, the external electronic device 10 may output a specified UI to the display in response to the input of the user 1 obtained in operation 703. For example, the specified UI may include a specified message of requesting input of identification information of the electronic device (e.g., the electronic device 100) selected through the input of the user 1.

In operation 707, the external electronic device 10 may transmit a first signal including request information for pairing to the electronic device 100. According to an embodiment, the first signal may be the same or similar to the second signal transmitted to the electronic device 100 in operation 511 illustrated in FIG. 5. For example, it may be understood that the first signal includes request information for pairing, for example, network information of the external electronic device 10.

In operations 709 to 719, the electronic device 100 and the external electronic device 10 may perform operations that are the same as or similar to the operations 507 to 523 illustrated in FIG. 5.

Through operations 701 to 719, the electronic device 100 may he connected to the external electronic device 10 to quickly and efficiently set the accessibility feature.

According to the embodiments disclosed in the disclosure, a user may reduce the time taken to set the accessibility feature of the electronic device. In addition, the user may use a new electronic device in the same usage environment as that of the electronic device previously used. Accordingly, the user may minimize heterogeneity in using a new electronic device and improve convenience in use.

According to an embodiment disclosed in the disclosure, an electronic device may include a wireless communication circuit that communicates with an external electronic device, and a processor, wherein the processor may pair the electronic device with the external electronic device by using the wireless communication circuit, obtain accessibility setting information of the external electronic device from the external electronic device, and set an accessibility feature of the electronic device based on at least a piece of the obtained accessibility setting information.

According to an embodiment, the electronic device may further include a display, wherein the processor may output a specified message requesting a user input on whether to obtain the accessibility setting information to the display, and obtain the accessibility setting information in response to receiving the user input for obtaining the accessibility setting information.

According to an embodiment, the electronic device may further include a display, wherein the processor may output a specified message requesting a user input on whether to obtain the accessibility setting information to the display, anti set the accessibility feature of the electronic device in response to receiving the user input for setting the accessibility feature.

According to an embodiment, the electronic device may further include a display, wherein the processor may output a specified message requesting a user input for selecting at least one piece from the obtained accessibility setting information to the display, and set the accessibility feature of the electronic device based on the selected at least one piece of the accessibility setting information in response to receiving the user input.

According to an embodiment, the processor may set whether to activate the accessibility feature of the electronic device based on at least a piece of the accessibility setting information. of the external electronic device.

According to an embodiment, the processor may set a detailed item of an activated feature among accessibility features of the electronic device based on at least a piece of the obtained accessibility setting information of the external electronic device.

According to an embodiment, the electronic device may further include a display, wherein the processor may transmit a first signal including request information for the pairing to the external electronic device by using the wireless communication circuit, receive a second signal including connection information for the pairing from the external electronic device by using the wireless communication circuit, output identification information for the pairing to the display in response to receiving the second signal, and pair the electronic device with the external electronic device.

According to an embodiment, the first signal may cause a specified message for execution or installation of a specified application in the external electronic device to be output.

According to an embodiment, the processor may output a specified message including guide information for the pairing to the display.

According to an embodiment, the processor may obtain a user input for the pairing, and transmit the first signal in response to receiving the user input.

According to an embodiment, the electronic device may further include a display, wherein the processor may receive a first signal including request information for pairing the electronic device and the external electronic device from the external electronic device by using the wireless communication circuit, output identification information for the pairing to the display in response to receiving the first signal, and pair the electronic device with the external electronic device.

According to an embodiment, the processor may pair the electronic device with the external electronic device through a server by using the wireless communication circuit.

According to an embodiment, the accessibility feature may include at least one of a voice assistant feature, a screen magnifier feature, a high contrast feature, or a color adjustment feature.

According to an embodiment disclosed in the disclosure, a method may include pairing with an external electronic device, obtaining accessibility setting information of the external electronic device from the external electronic device, and setting an accessibility feature of the electronic device based on at least a piece of the obtained accessibility setting information.

According to an embodiment, the method may further include outputting a specified message requesting a user input on whether to obtain the accessibility setting information to a display, receiving the user input for obtaining the accessibility setting information, and obtaining the accessibility setting information in response to receiving the user input.

According to an embodiment, the method may further include outputting a specified message requesting a user input on whether to obtain the accessibility setting information to the display, receiving the user input for setting the accessibility feature, and setting the accessibility feature of the electronic device in response to the reception of the user input.

According to an embodiment, the method may further include output a specified message requesting a user input for selecting at least one piece from the obtained accessibility setting information to the display, receiving the user input for selecting at least one of the obtained accessibility setting information, and setting the accessibility feature of the electronic device based on the selected at least one piece of the accessibility setting information in response to receiving the user input.

According to an embodiment, the setting of the accessibility feature of the electronic device based on the at least a piece of the obtained accessibility setting information may include setting whether to activate the accessibility feature of the electronic device.

According to an embodiment, the setting of the accessibility feature of the electronic device based on the at least a piece of the obtained accessibility setting information may include setting detailed items of an activated feature of the accessibility feature.

According to an embodiment, the method may further include transmitting a first signal including request information for the pairing to the external electronic device, receiving a second signal including connection information for the pairing from the external electronic device, outputting identification information for the pairing to the display in response to receiving the second signal, and pairing the electronic device with the external electronic device.

At least some of the devices (for example, modules or functions thereof) or the methods (for example, operations) according to various embodiments may be implemented by an instruction stored in a computer-readable storage medium in a programming module form. When the instruction is executed by a processor, the processor may execute a function corresponding to the instruction. The computer readable recording medium may include a hard disc, a floppy disc, magnetic media (e.g., a magnetic tape), optical media (e.g., CD-ROM or DVD), magneto-optical media (e.g., a floptical disk), and an embedded memory. The instructions may include codes made, by a compiler or executable by an interpreter.

The embodiments disclosed in the specification are merely presented to easily describe the technical contents of the disclosure and help with the understanding of the disclosure and are not intended to limit the scope of the disclosure. Therefore, all changes or modifications derived from the technical idea of the disclosure as well as the embodiments described herein should be interpreted to belong to the scope of the disclosure.

What is claimed is:
1. An electronic device comprising:
a wireless communication circuit configured to communicate with an external electronic device; and
a processor,
wherein the processor is configured to:
pair the electronic device with the external electronic device using the wireless communication circuit, obtain, from the external electronic device, accessibility setting information about a second accessibility feature set in the external electronic device, and based on a first accessibility feature of the electronic device being differently set from the second accessibility feature of the external electronic device, set the first accessibility feature of the electronic device based on at least a piece of the obtained accessibility setting information such that the first accessibility feature of the electronic device is set in the same manner as the second accessibility feature of the external electronic device, wherein the accessibility setting information includes at least one of information associated with at least one accessibility feature activated in the external electronic device, information associated with at least one accessibility feature deactivated in the external electronic device, or information associated with a detailed item of the at least one accessibility feature activated in the external electronic device.

2. The electronic device of claim 1, further comprising:
a display,
wherein the processor is configured to:
output, to the display, a specified message requesting a user input on whether to obtain the accessibility setting information, and
obtain the accessibility setting information in response to receiving the user input for obtaining the accessibility setting information.

3. The electronic device of claim 1, further comprising:
a display,
wherein the processor is configured to:
output, to the display, a specified message requesting a user input on whether to set the first accessibility setting information, and
set the first accessibility feature of the electronic device in response to receiving the user input for setting the accessibility feature.

4. The electronic device of claim 1, further comprising:
a display,
wherein the display is configured to:
output, to the display, a specified message requesting a user input for selecting at least one piece from the obtained accessibility setting information; and
set the first accessibility feature of the electronic device based on the selected at least one piece of the accessibility setting information in response to receiving the user input.

5. The electronic device of claim 1, wherein the processor is configured to set whether to activate the first accessibility feature of the electronic device based on at least a piece of the obtained accessibility setting information.

6. The electronic device of claim 5, wherein the processor is configured to set the detailed item of an activated feature among first accessibility features of the electronic device based on at least a piece of the obtained accessibility setting information.

7. The electronic device of claim 1, further comprising:
a display,
wherein the processor is configured to:
transmit a first signal including request information for the pairing to the external electronic device using the wireless communication circuit,
receive a second signal including connection information for the pairing from the external electronic device using the wireless communication circuit,
output identification information for the pairing to the display in response to receiving the second signal, and
pair the electronic device with the external electronic device.

8. The electronic device of claim 7, wherein the first signal causes a specified message for execution or installation of a specified application in the external electronic device to be output.

9. The electronic device of claim 7, wherein the processor is configured to output a specified message including guide information for the pairing to the display.

10. The electronic device of claim 7, wherein the processor is configured to:
obtain a user input for the pairing, and
transmit the first signal in response to receiving the user input.

11. The electronic device of claim 1, further comprising:
a display,
wherein the processor is configured to:
receive a first signal including request information for pairing the electronic device and the external electronic device from the external electronic device using the wireless communication circuit,
output identification information for the pairing to the display in response to receiving the first signal, and
pair the electronic device with the external electronic device.

12. The electronic device of claim 1, wherein the processor is configured to pair the electronic device with the external electronic device through a server using the wireless communication circuit.

13. The electronic device of claim 1, wherein the first accessibility feature includes at least one of a voice assistant feature, a screen magnifier feature, a high contrast feature, or a color adjustment feature.

14. A method of setting a first accessibility feature of an electronic device, the method comprising:
pairing with an external electronic device;
obtaining accessibility setting information about a second accessibility feature set in the external electronic device, and
based on the first accessibility feature of the electronic device being differently set from the second accessibility feature of the external electronic device, setting the first accessibility feature of the electronic device based on at least a piece of the obtained accessibility setting information such that the accessibility feature of the electronic device is set in the same manner as the second accessibility feature of the external electronic device,
wherein the accessibility setting information includes at least one of information associated with at least one accessibility feature activated in the external electronic device, information associated with at least one accessibility feature deactivated in the external electronic device, or information associated with a detailed item of the at least one accessibility feature activated in the external electronic device.

15. The method of claim 14, further comprising:
outputting, to a display, specified message requesting a user input on whether to obtain the accessibility setting information; and
obtaining the accessibility setting information in response to receiving the user input for obtaining the accessibility setting information.

* * * * *